US009668081B1

(12) United States Patent
Chen et al.

(10) Patent No.: US 9,668,081 B1
(45) Date of Patent: May 30, 2017

(54) FREQUENCY RESPONSE COMPENSATION METHOD, ELECTRONIC DEVICE, AND COMPUTER READABLE MEDIUM USING THE SAME

(71) Applicant: HTC Corporation, Taoyuan (TW)

(72) Inventors: Lei Chen, Taoyuan (TW); Hann-Shi Tong, Taoyuan (TW); Chih-Chiang Cheng, Taoyuan (TW); Yu-Chieh Lai, Taoyuan (TW); Che-Yi Hsiao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/079,009

(22) Filed: Mar. 23, 2016

(51) Int. Cl.
*H04R 3/04* (2006.01)
*H04S 7/00* (2006.01)
*H04M 1/02* (2006.01)
*H04R 3/14* (2006.01)

(52) U.S. Cl.
CPC ............ *H04S 7/307* (2013.01); *H04M 1/026* (2013.01); *H04R 3/14* (2013.01); *H04S 7/301* (2013.01)

(58) Field of Classification Search
CPC ........ H04S 1/005; H04S 5/00; H04S 2420/07; H04M 1/6041; H04M 1/605
USPC ............ 381/101, 56, 17, 309, 69; 455/569.1
See application file for complete search history.

(56) References Cited

U.S. PATENT DOCUMENTS 8,295,498 B2 10/2012 Karlsson et al.
8,897,471 B2 * 11/2014 Douhet .................. H04M 1/03 381/182
2009/0086982 A1 4/2009 Kulkarni et al.
2011/0268281 A1 11/2011 Florencio et al.
2013/0322636 A1 * 12/2013 Vickers .................. H04S 1/005 381/17

* cited by examiner

*Primary Examiner* — Melur Ramakrishnaiah
(74) *Attorney, Agent, or Firm* — Jianq Chyun IP Office

(57) ABSTRACT

A response compensation method, an electronic device and a computer recording medium are provided, where the method is adapted to an electronic device having two non-coplanarly disposed speakers and includes the following steps. A stereo audio signal is respectively high-pass filtered and low-pass filtered followed by sound-field processing to generate a modified high-frequency right-channel signal, a modified high-frequency left-channel signal, a modified low-frequency right-channel signal, and a modified low-frequency left-channel signal. The modified high-frequency right-channel signal and the modified low-frequency right-channel signal are outputted to the first speaker, and the modified high-frequency left-channel signal and the modified low-frequency left-channel signal are outputted to the second speaker, where the modified high-frequency right-channel signal and the modified high-frequency left-channel signal are outputted diffusely by the two speakers, and the modified low-frequency right-channel signal and the modified low-frequency left-channel signal are outputted centrally by the two speakers.

19 Claims, 5 Drawing Sheets

FREQUENCY RESPONSE COMPENSATION METHOD, ELECTRONIC DEVICE, AND COMPUTER READABLE MEDIUM USING THE SAME

TECHNICAL FIELD

The disclosure relates to a frequency response compensation method, an electronic device and a computer readable medium using the same.

BACKGROUND

A handheld mobile electronic device such as a smart phone has become multi-purpose oriented as data processing, personal organizing, entertainment, and communication features are integrated into one portable pocket-sized computer system. The versatility of such device has enabled users to explore an increasing variety of applications other than traditional phone use.

In addition to a phone speaker, such device is conventionally equipped with a multimedia speaker to playback multimedia content such as music, video, and etc. The phone speaker, also known as a receiver, would be disposed on top of a screen of the device, and the multimedia speaker would be normally disposed on the sides or the back of the device due to limited space and aesthetic concerns. This would nevertheless result in a human-detectable offset between two different sounds output by the two non-coplanarly disposed speakers.

SUMMARY OF THE DISCLOSURE

Accordingly, the disclosure is directed to a frequency response compensation method, an electronic device and a computer readable medium using the same, which not only obviates an offset caused by two non-coplanarly disposed speakers, but also creates a more pronounced stereoscopic effect and provides a more pleasing listening experience for the user.

According to one of the exemplary embodiments, the disclosure is directed to a frequency response compensation method adapted to an electronic device having a first speaker and a second speaker, where the first speaker and the second speaker are not coplanarly disposed on the electronic device. The method includes the following steps. First, a stereo audio signal is respectively inputted into a high-pass filter and a low-pass filter to generate a high-frequency right-channel signal, a high-frequency left-channel signal, a low-frequency right-channel signal, and a low-frequency left-channel signal. Next, sound-field processing is performed on the high-frequency right-channel signal and the high-frequency left-channel signal to generate a modified high-frequency right-channel signal and a modified high-frequency left-channel signal, and sound-field processing is performed on the low-frequency right-channel signal and the low-frequency left-channel signal to generate a modified low-frequency right-channel signal and a modified low-frequency left-channel signal. The modified high-frequency right-channel signal and the modified low-frequency right-channel signal are outputted to the first speaker, and the modified high-frequency left-channel signal and the modified low-frequency left-channel signal are outputted to the second speaker, where the modified high-frequency right-channel signal and the modified high-frequency left-channel signal are outputted diffusely respectively by the first speaker and the second speaker, and the modified low-frequency right-channel signal and the modified low-frequency left-channel signal are outputted centrally respectively by the first speaker and the second speaker.

According to one of the exemplary embodiments, the disclosure is directed to an electronic device. The electronic device includes a first speaker, a second speaker, a memory, and a controller. The first speaker and the second speaker are not coplanarly disposed on the electronic device. The controller is coupled to the first speaker, the second speaker, and the memory. The controller is configured for: inputting a stereo audio signal respectively into a high-pass filter and a low-pass filter to generate a high-frequency right-channel signal, a high-frequency left-channel signal, a low-frequency right-channel signal, and a low-frequency left-channel signal; performing sound-field processing on the high-frequency right-channel signal and the high-frequency left-channel signal to generate a modified high-frequency right-channel signal and a modified high-frequency left-channel signal; performing sound-field processing on the high-frequency right-channel signal and the high-frequency left-channel signal to generate a modified high-frequency right-channel signal and a modified high-frequency left-channel signal; and outputting the modified high-frequency right-channel signal and the modified low-frequency right-channel signal to the first speaker, and outputting the modified high-frequency left-channel signal and the modified low-frequency left-channel signal to the second speaker, where the modified high-frequency right-channel signal and the modified high-frequency left-channel signal are outputted diffusely respectively by the first speaker and the second speaker, and the modified low-frequency right-channel signal and the modified low-frequency left-channel signal are outputted centrally respectively by the first speaker and the second speaker.

According to one of exemplary embodiments, the disclosure is also directed to a non-transitory computer readable medium, which records computer program to be loaded into an electronic device having two non-coplanarly disposed speakers to execute the steps of the aforementioned method.

In view of the aforementioned descriptions, the disclosure provides a frequency compensation technique for an electronic device with two non-coplanarly disposed speakers through frequency separation as well as parallel sound-field processing in high frequencies and low frequencies so that the user is able to perceive a more spacious sound in high frequencies and a more concentrated sound in low frequencies. The disclosure not only obviates an offset caused by the two non-coplanarly disposed speakers, but also creates a more pronounced stereoscopic effect and provides a more pleasing listening experience for the user.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
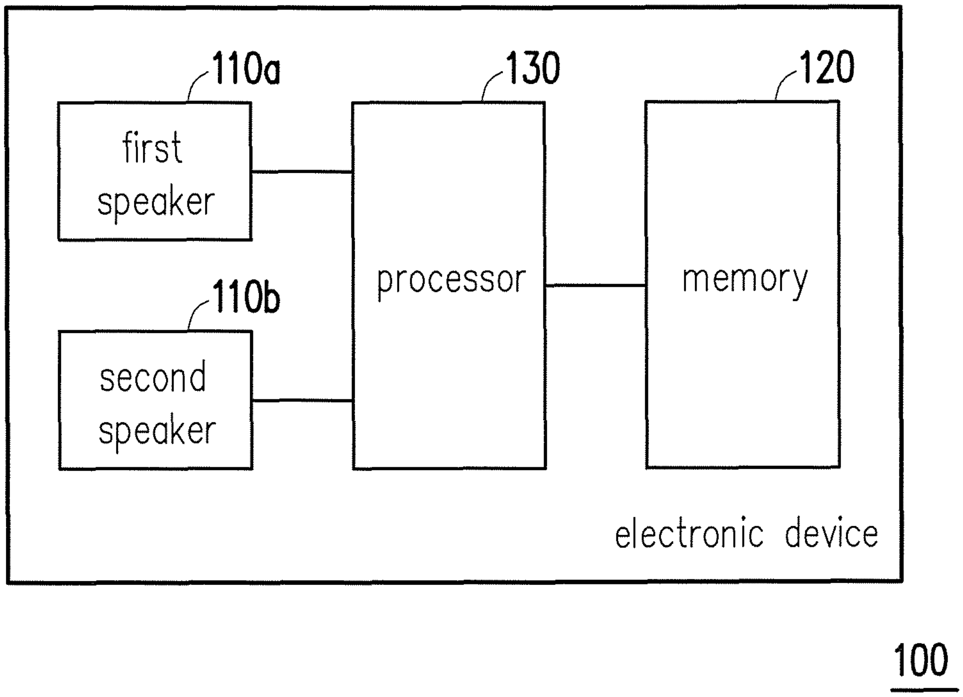
FIG. 1 illustrates an electronic device which utilizes the proposed method from the hardware perspective in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates an electronic device which utilizes the proposed method from the hardware perspective in accordance with one of the exemplary embodiments of the disclosure. All components of the electronic device and their configurations are first introduced in FIG. 1. The functionalities of the components are disclosed in more detail in conjunction with FIG. 2.

Referring to FIG. 1, an exemplary electronic device 100 would include a first speaker 110*a*, a second speaker 110*b*, a memory 120, and a controller 130. The electronic device 100 could be a mobile phone, a personal digital assistant (PDA), a tablet, and so forth.

The first speaker 110*a* and the second speaker 110*b* would not be coplanarly disposed on the electronic device 100. As an example, the electronic device 100 could be a mobile phone, the first speaker 110*a* could be a phone speaker disposed on a front side of the electronic device 100, and the second speaker 110*b* could be a multimedia speaker disposed on another side perpendicular to the front side of the electronic device 100.

The memory 120 may include various forms of non-transitory, volatile, and non-volatile memories such as one or a combination of a stationary or mobile random access memory (RAM), a read-only memory (ROM), a flash memory, a hard drive or other similar devices. The memory 10 would store buffered or permanent data such as sound data and compiled programming codes used to execute functions of the exemplary electronic device 100.

The controller 130 may include one or more of a North Bridge, a South Bridge, a field programmable array (FPGA), a programmable logic device (PLD), an application specific integrated circuit (ASIC), or other similar device or a combination thereof. The controller 140 may also include a central processing unit (CPU), a programmable general purpose or special purpose microprocessor, a digital signal processor (DSP), a graphics processing unit (GPU), an application specific integrated circuit (ASIC), a programmable logic device (PLD), or other similar device or a combination thereof. As an example, the controller 130 could include a central processing unit and a sound processor, where the sound processor could further include a digital signal processor and a sound codec. The controller 130 would be coupled to the first speaker 110*a*, the second speaker 110*b*, and the memory 120 and would be used to perform the method as proposed.

Figure 2:
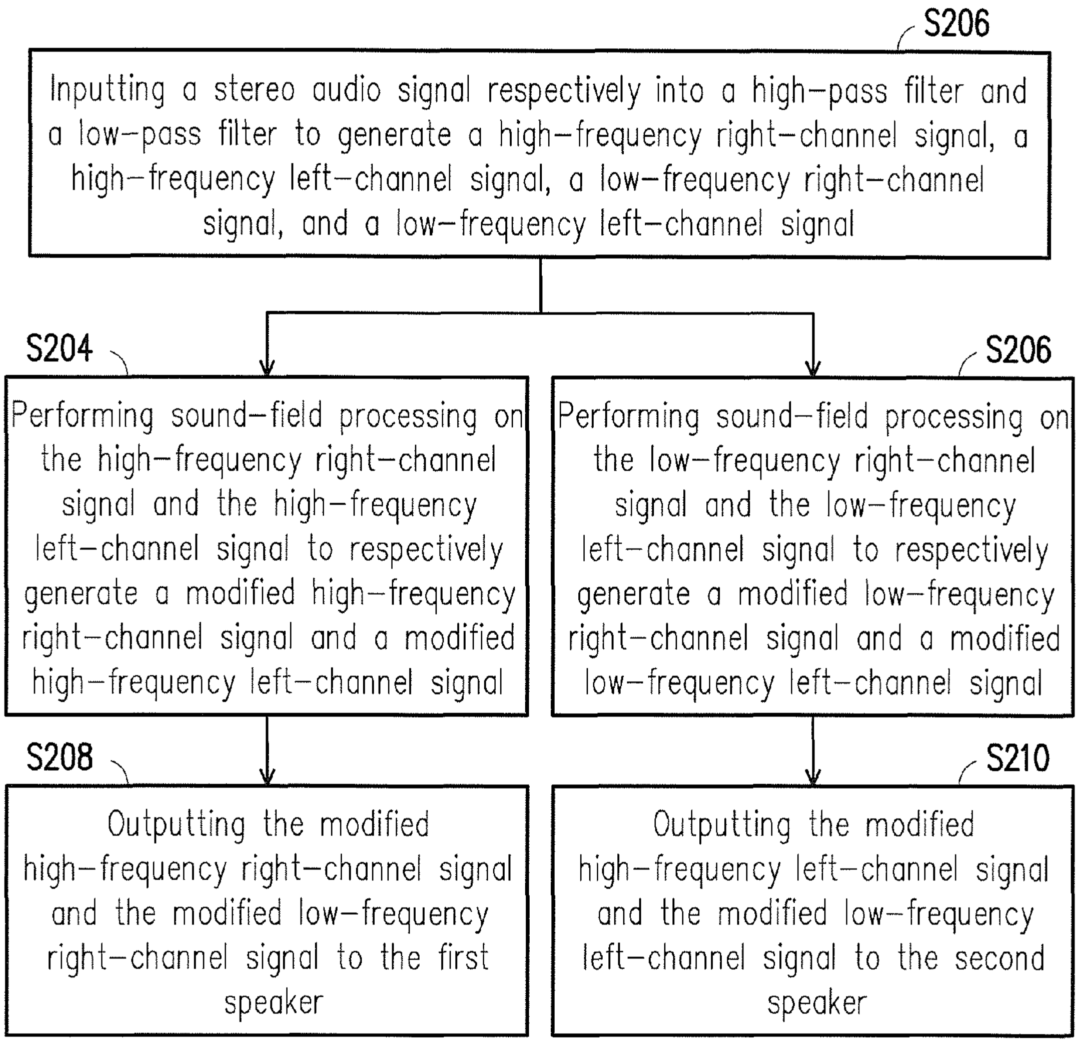
FIG. 2 illustrates a flowchart of a frequency response compensation method in accordance with one of the exemplary embodiments of the disclosure.

FIG. 2 illustrates a flowchart of a frequency response compensation method in accordance with one of the exemplary embodiments of the disclosure. The steps of FIG. 2 could be implemented by the proposed electronic device 100 as illustrated in FIG. 1, as the first speaker 110*a* and the second speaker 110*b* are not coplanarly disposed.

Due to the nature of the sounds, those with high frequencies have a tendency to be more directional and their energy dissipates more rapidly, while those with low frequencies tend to be omni-directional and more difficult to be localized by humans. The proposed method would first separate a stereo audio signal into a high-frequency signal portion and a low-frequency signal portion and concurrently process each portion. Therefore, to start up with two parallel processes, referring to FIG. 2, after a stereo audio signal is retrieved from an audio source, the controller 130 would input the stereo audio signal respectively into a high-pass filter and a low-pass filter to generate a high-frequency right-channel signal, a high-frequency left-channel signal, a low-frequency right-channel signal, and a low-frequency left-channel signal (Step S202). The audio source could be a telephone application, a TV or radio broadcast, an audio file, an audio stream, audio data of a video file, audio data of a video stream, and etc. The high-pass filter and the low-pass filter could be two individual filters or integrated into one single filter, where a threshold frequency for distinguishing high and low frequencies may be set as desired. Ideally speaking, the high-pass filter would only allow high frequencies to pass through but cut off low frequencies, and the low-pass filter would only allow low-frequencies to pass through but cut off the high frequencies. Herein, the stereo audio signal includes left and right channels (referred to as "a right-channel input signal" and "a left-channel input signal" hereafter). In other words, the controller 130 would input the right-channel input signal and the left-channel input signal into the high-pass filter to respectively generate the high-frequency right-channel signal and the high-frequency left-channel signal, and the controller 130 would also input the right-channel input signal and the left-channel input signal into the low-pass filter to respectively generate the low-frequency right-channel signal and the low-frequency left-channel signal.

Next, the controller 130 would perform sound-field processing on the high-frequency right-channel signal and the high-frequency left-channel signal to respectively generate a modified high-frequency right-channel signal and a modified high-frequency left-channel signal (Step S204). Meanwhile, the controller 130 would also perform sound-field processing on the low-frequency right-channel signal and the low-frequency left-channel signal to respectively generate a modified low-frequency right-channel signal and a modified low-frequency left-channel signal (Step S206). The controller 130 would then output the modified high-frequency right-channel signal and the modified low-frequency right-channel signal to the first speaker 110*a* (Step S208), and output the modified high-frequency left-channel signal and the modified low-frequency left-channel signal to the second speaker 110*b* (Step S210). Herein, the modified high-frequency right-channel signal and the modified high-frequency left-channel signal would be outputted by the two speakers after digital-to-analog conversion and propagated diffusely in human perception. That is, the user would perceive a more spacious sound in high frequencies. On the other hand, the modified high-frequency right-channel signal and the modified high-frequency left-channel signal would be outputted by the two speakers after digital-to-analog conversion and propagated centrally in human perception. That is, the user would perceive a more concentrated sound in low frequencies. In such approach, a more pronounced stereoscopic effect would be created and provides a more pleasing listening experience for the user.

The sound-field processing in Step S204 and Step S206 could involve audio signal manipulation through, for example, equalization, multiband dynamic range control, and transfer functions. The equalization is a process of adjusting the balance between frequency components in an audio signal. The multiband dynamic range control involves performing various processes on an audio signal to affect the amplitude of the audio signal. Modification of the amplitude of the signal acts to make the signal louder or softer, which can greatly affect the perceived quality of the signal. The equalization and the multiband dynamic range control independently adopted in the high frequencies and the low frequencies would compensate the frequency response characteristics of the two non-coplanarly disposed speakers. It is readily possible for a person skilled in the art to choose any of the various existing equalization and multiband dynamic range control algorithms and implement those in the controller 130.

Figure 3:
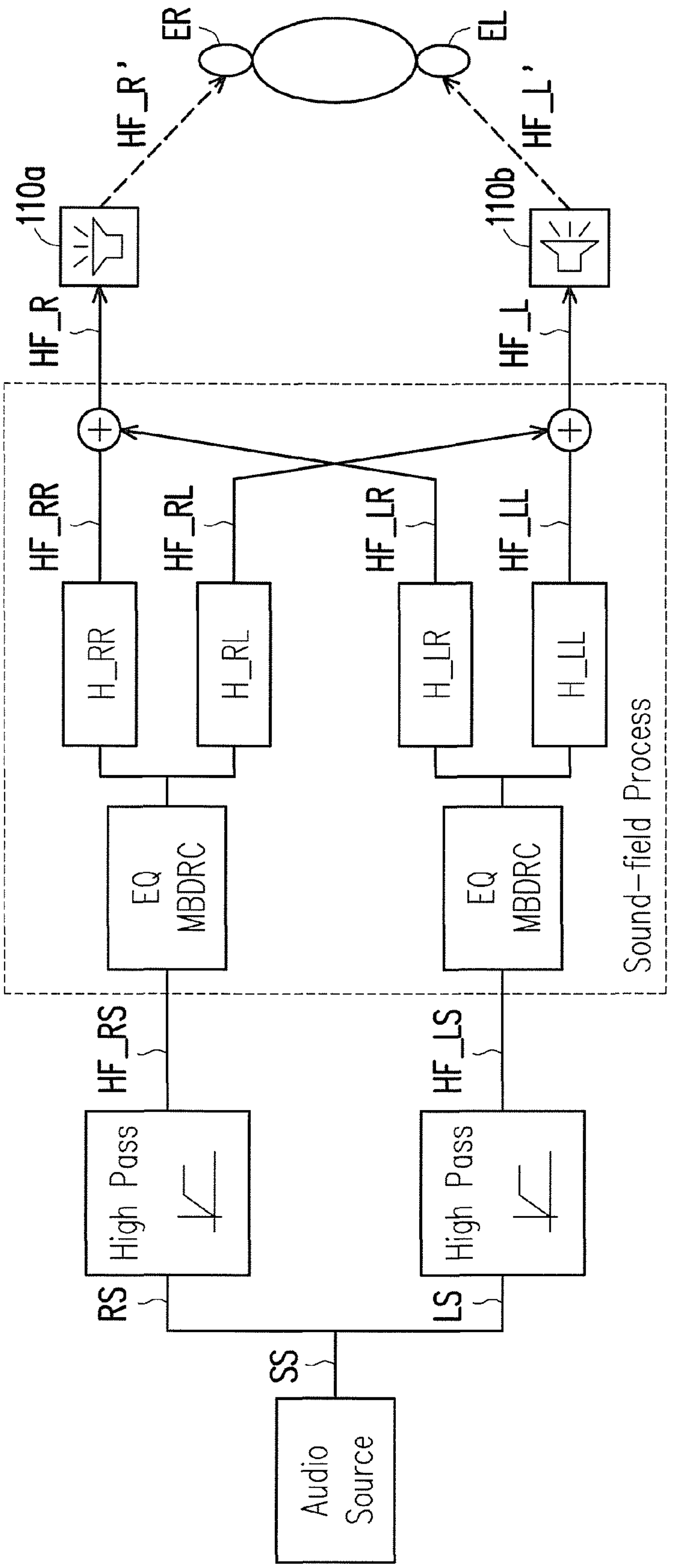
FIG. 3 illustrates a functional block diagram of a frequency response compensation method in high frequencies in accordance with one of the exemplary embodiments of the disclosure.

For better understanding of the use of the transfer functions in conjunction with the equalization and the multiband dynamic range control, FIG. 3 illustrates a functional block diagram of a frequency response compensation method in high frequencies in accordance with one of the exemplary embodiments of the disclosure.

Referring to FIG. 3, the controller 130 would input a right-channel signal RS and left-channel signal LS of a stereo audio signal SS respectively into a high-pass filter HF to generate a high-frequency right-channel signal HF_RS and a high-frequency left-channel signal HF_LS. Next, the controller 130 would apply equalization and/or multiband dynamic range control EQ/MBDRC and split the high-frequency right-channel signal HF_RS into two identical signals and respectively apply a first transfer function H_RR and a second transfer function H_RL thereon to generate a main high-frequency right-channel signal HF_RR and a secondary high-frequency right-channel signal HF_RL. Similarly, the controller 130 would also apply equalization and/or multiband dynamic range control and split the high-frequency right-channel signal HF_LS into two identical signals and respectively apply a third transfer function H_LL and a fourth transfer function H_LR thereon to generate a main high-frequency left-channel signal HF_LL and a secondary high-frequency left-channel signal HF_LR.

The controller 130 would add the main high-frequency right-channel signal HF_RR and the secondary high-frequency left-channel signal HF_LR to generate a modified high-frequency right-channel signal HF_R. The controller 130 would also add the main high-frequency left-channel signal HF_LL and the secondary high-frequency right-channel signal HF_RL to generate a modified high-frequency left-channel signal HF_L. The controller 130 would then output the modified high-frequency right-channel signal HF_R and the modified high-frequency left-channel signal HF_L respectively to the first speaker 110*a* and the second speaker 110*b*. The user's right ear ER and left ear EL would perceive a diffusely outputted high-frequency right-channel sound HF_R' and a high-frequency left-channel sound HF_L' by the first speaker 110*a* and the second speaker 110*b* after digital-to-analog conversion.

The modified high-frequency left-channel signal and the modified high-frequency right-channel signal are modified based on the aforementioned four transfer functions pre-stored in the memory 120. In an exemplary embodiment, the four transfer functions could be estimated during an experimental procedure through a dummy head recording technique which involves the use of a dummy head outfitted with a microphone in each ear. To be specific, a device under test (DUT) with substantially identical hardware specifications would be placed at a source position, and a dummy head would be placed at a target position, where the source position is near and in front of the target position, just as it would be in practice. Moreover, an additional microphone would be placed between the target position and the source position, referred to as an intermediate position. A first test speaker and a second test speaker of the DUT would output high-frequency audio sounds. The responses measured at the source position, the intermediate position, and the target position would be used for estimating the four transfer functions given that the responses measured at the intermediate position and the target position are diffused with respect to those measured at the source position. The four transfer functions could be estimated differently for various sound effects, sound-playing environments, and hardware specifications. The disclosure is not limited in this regard.

In another embodiment, the four transfer functions could be obtained through mathematical derivation. The four transfer functions could be written as a transfer matrix $H_1$ as in Eq.(1):

$$H_1 = \begin{pmatrix} \text{H\_RR} & \text{H\_LR} \\ \text{H\_RL} & \text{H\_LL} \end{pmatrix} \quad \text{Eq. (1)}$$

It should be noted that, the transfer matrix $H_1$ would be a multiplication of an inverse acoustic matrix matrix and an acoustic transfer matrix, where the acoustic transfer matrix describes an acoustic path from the two speakers 110*a*, 110*b* and the user's ears and is assumed to be known (i.e. given by one of many existing techniques). To reproduce the high-frequency signals perceived diffusedly at the user's ears (i.e. with no acoustic crosstalk and interference), the inverse acoustic matrix would be an inverse of the acoustic transfer matrix. It other words, the transfer matrix $H_1$ would become an identity matrix as in Eq.(2):

$$H_1 = \begin{pmatrix} 1 & 0 \\ 0 & 1 \end{pmatrix} \quad \text{Eq. (2)}$$

Figure 4:
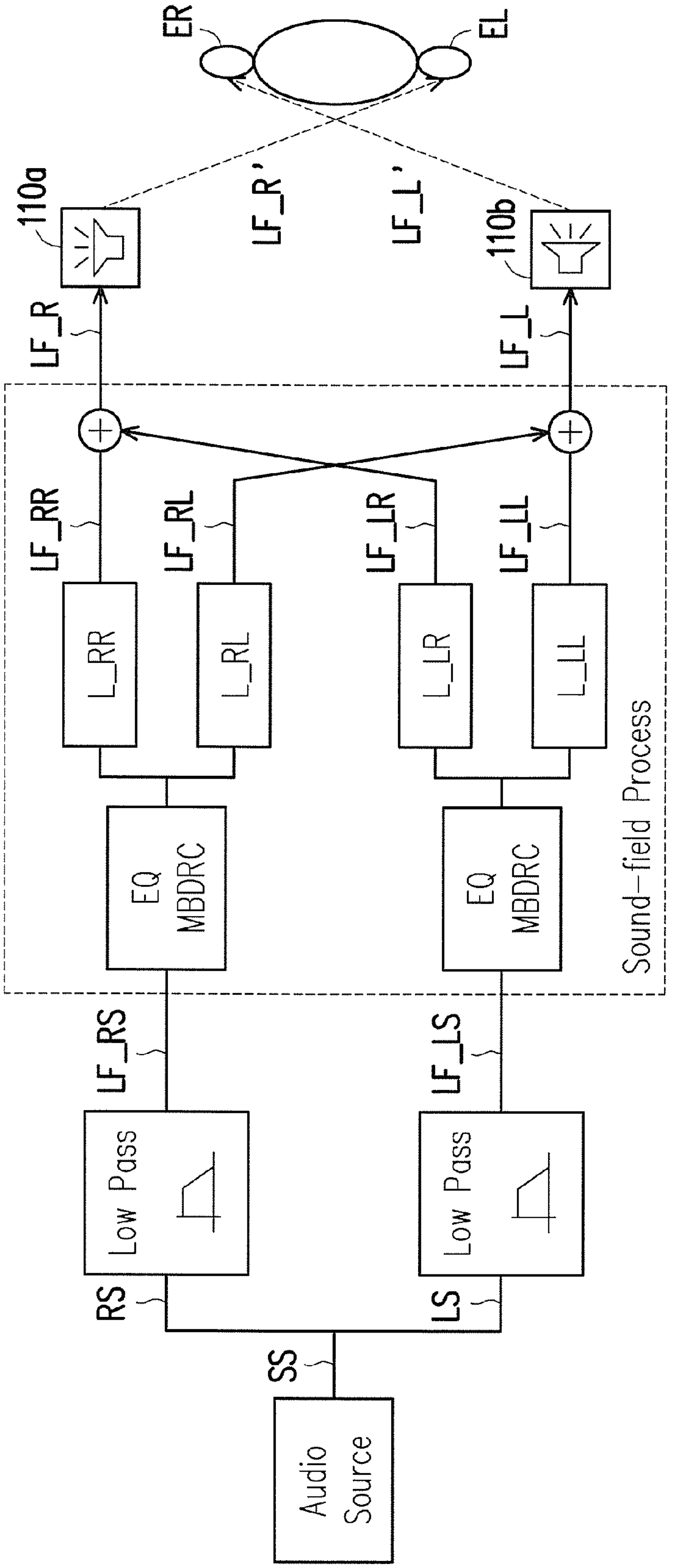
FIG. 4 illustrates a functional block diagram of a frequency response compensation method in low frequencies in accordance with one of the exemplary embodiments of the disclosure.

In a similar fashion, FIG. 4 illustrates a functional block diagram of a frequency response compensation method in low frequencies in accordance with one of the exemplary embodiments of the disclosure.

Referring to FIG. 4, the controller 130 would also input the right-channel signal RS and the left-channel signal LS of the stereo audio signal SS respectively into a low-pass filter LF to generate a low-frequency right-channel signal LF_RS and a low-frequency left-channel signal LF_LS. Next, the controller 130 would apply equalization and/or multiband dynamic range control and split the low-frequency right-channel signal LF_RS into two identical signals and respectively apply a fifth transfer function L_RR and a sixth transfer function L_RL thereon to generate a main low-frequency right-channel signal LF_RR and a secondary low-frequency right-channel signal LF_RL. Similarly, the controller 130 would also apply equalization and/or multi-band dynamic range control and split the low-frequency right-channel signal LF_LS into two identical signals and respectively apply a seventh transfer function L_LL and an eighth transfer function L_LR thereon to generate a main low-frequency left-channel signal LF_LL and a secondary low-frequency left-channel signal LF_LR.

The controller 130 would add the main low-frequency right-channel signal LF_RR and the secondary low-frequency left-channel signal LF_LR to generate a modified low-frequency right-channel signal LF_R. The controller 130 would also add the main low-frequency left-channel signal LF_LL and the secondary low-frequency right-channel signal LF_RL to generate a modified low-frequency left-channel signal LF_L. The controller 130 would then output the modified low-frequency right-channel signal LF_R and the modified low-frequency left-channel signal LF_L respectively to the first speaker 110*a* and the second speaker 110*b*. The user's right ear ER and left ear EL would perceive a centrally outputted low-frequency right-channel sound LF_R' and a low-frequency left-channel sound LF_L' by the first speaker 110*a* and the second speaker 110*b* after digital-to-analog conversion.

Similarly, in an exemplary embodiment, the four transfer functions could be estimated during an experimental procedure and prestored in the memory 120. In this case, the first test speaker and the second test speaker of the DUT would output low-frequency audio sounds. The responses measured at the source position, the intermediate position, and the target position would be used for estimating the four transfer functions given that the responses measured at the intermediate position and the target position are concentrated with respect to those measured at the source position. The four transfer functions could be estimated differently for various sound effects, sound-playing environments, and hardware specifications. The disclosure is not limited in this regard.

In another embodiment, the four transfer functions could also be obtained through mathematical derivation. The four transfer functions could be written as a transfer matrix $H_2$ as in Eq.(3):

$$H_2 = \begin{pmatrix} \text{L\_LR} & \text{L\_RR} \\ \text{L\_LL} & \text{L\_RL} \end{pmatrix} \quad \text{Eq. (3)}$$

It should be noted that, in a similar fashion, the transfer matrix $H_2$ would be a multiplication of an inverse acoustic matrix and an acoustic transfer matrix, where the acoustic transfer matrix describes an acoustic path from the two speakers 110*a*, 110*b* and the user's ears and is assumed to be known. To reproduce the input audio signals perceived centrally at the user's ears, the inverse acoustic matrix would be an inverse of the acoustic transfer matrix that causes the transfer matrix $H_2$ to become an identity matrix as in Eq.(4):

$$H_2 = \begin{pmatrix} 1 & 0 \\ 0 & 1 \end{pmatrix} \quad \text{Eq. (4)}$$

Figure 5:
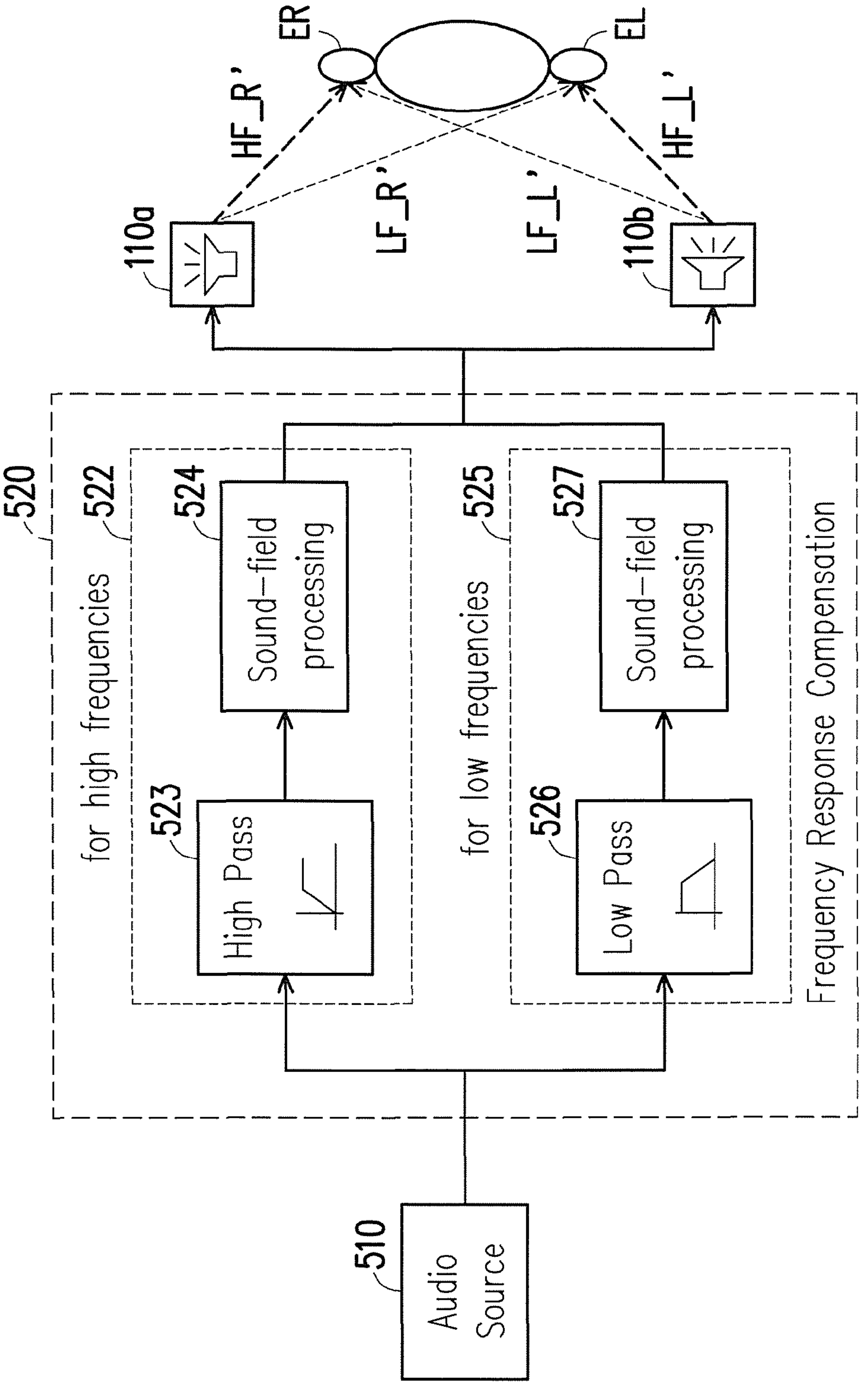
FIG. 5 illustrates a functional block diagram of a frequency response compensation method in accordance with one of the exemplary embodiments of the disclosure.

The proposed method may be summarized in terms of functional block diagram of a frequency response compensation method as illustrated in FIG. 5 in accordance with one of the exemplary embodiments of the disclosure.

Referring to FIG. 5, stereo audio signals retrieved from an audio source 510 would be separated into high frequencies and low frequencies for frequency response compensation 520. High-pass filtering 523 and sound-filed processing 524 would be performed on the signals with high frequencies 522 and processed results would be outputted to the first speaker 110*a*. Low-pass filtering 526 and sound-filed processing 527 would be performed on the signals with low frequencies 525 and processed results would be outputted to the second speaker 110*b*. After digital-to-analog conversion is performed on the processed results, the user's right ear ER and left ear EL would perceive a centrally outputted low-frequency right-channel sound LF_R' and a low-frequency left-channel sound LF_L' by the first speaker 110*a* and the second speaker 110*b* as well as a diffusely outputted high-frequency right-channel sound HF_R' and a high-frequency left-channel sound HF_L' by the first speaker 110*a* and the second speaker 110*b*.

The disclosure also provides a non-transitory computer readable medium, which records computer program to be loaded into an electronic device having two non-coplanarly disposed speakers to execute the steps of the aforementioned frequency response compensation method. The computer program is composed of a plurality of program instructions (for example, an organization chart, establishing program instruction, a table approving program instruction, a setting program instruction, and a deployment program instruction, etc), and these program instructions are loaded into the electronic device and executed by the same to accomplish various steps of the frequency response compensation method.

In view of the aforementioned descriptions, the disclosure provides a frequency compensation technique for an electronic device with two non-coplanarly disposed speakers through frequency separation as well as parallel sound-field processing in high frequencies and low frequencies so that the user is able to perceive a more spacious sound in high frequencies and a more concentrated sound in low frequencies. The disclosure not only obviates an offset caused by the two non-coplanarly disposed speakers, but also creates a more pronounced stereoscopic effect and provides a more pleasing listening experience for the user.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A frequency response compensation method, adapted to an electronic device having a first speaker and a second speaker, wherein the first speaker and the second speaker are not coplanarly disposed on the electronic device, and wherein the method comprises:

inputting a stereo audio signal respectively into a high-pass filter and a low-pass filter to generate a high-frequency right-channel signal, a high-frequency left-channel signal, a low-frequency right-channel signal, and a low-frequency left-channel signal;

performing sound-field processing on the high-frequency right-channel signal and the high-frequency left-channel signal to generate a modified high-frequency right-channel signal and a modified high-frequency left-channel signal;

performing sound-field processing on the low-frequency right-channel signal and the low-frequency left-channel signal to generate a modified low-frequency right-channel signal and a modified low-frequency left-channel signal; and outputting the modified high-frequency right-channel signal and the modified low-frequency right-channel signal to the first speaker and outputting the modified high-frequency left-channel signal and the modified low-frequency left-channel signal to the second speaker, wherein the modified high-frequency right-channel signal and the modified high-frequency left-channel signal are outputted diffusely by the first speaker and the second speaker, and wherein the modified low-frequency right-channel signal and the modified low-frequency left-channel signal are outputted centrally by the first speaker and the second speaker.

2. The frequency response compensation method according to claim 1, wherein the step of inputting the stereo audio signal respectively into the high-pass filter and the low-pass filter to generate the high-frequency right-channel signal, the high-frequency left-channel signal, the low-frequency right-channel signal, and the low-frequency left-channel signal comprises:

inputting a right-channel input signal and a left-channel input signal of the stereo audio signal into the high-pass filter to respectively generate the high-frequency right-channel signal and the high-frequency left-channel signal; and inputting the right-channel input signal and the left-channel input signal into the low-pass filter to respectively generate the low-frequency right-channel signal and the low-frequency left-channel signal.

3. The frequency response compensation method according to claim 1, wherein the step of performing sound-field processing on the high-frequency right-channel signal and the high-frequency left-channel signal to generate the modified high-frequency right-channel signal and the modified high-frequency left-channel signal comprises:

applying a first transfer function and a second transfer function respectively on the high-frequency right-channel signal to generate a main high-frequency right-channel signal and a secondary high-frequency right-channel signal;

applying a third transfer function and a fourth transfer function respectively on the high-frequency left-channel signal to respectively generate a main high-frequency left-channel signal and a secondary high-frequency left-channel signal;

adding the main high-frequency right-channel signal and the secondary high-frequency left-channel signal to generate the modified high-frequency right-channel signal; and adding the main high-frequency left-channel signal and the secondary high-frequency right-channel signal to generate the modified high-frequency left-channel signal.

4. The frequency response compensation method according to claim 3, wherein before the step of inputting the stereo audio signal respectively into the high-pass filter and the low-pass filter, the method further comprises:

obtaining the first transfer function, the second transfer function, the third transfer function, and the fourth transfer function, wherein the first transfer function, the second transfer function, the third transfer function, and the fourth transfer function are calculated based on frequency responses at an intermediate position and a target position after high-frequency audio sound is outputted by a first test speaker and a second test speaker at an source position such that the responses at the intermediate position and the target position are diffused with respect to those at the source position, wherein the intermediate position is located between the source position and the target position, and wherein the first test speaker and the second test speaker are substantially and respectively identical to the first speaker and the second speaker.

5. The frequency response compensation method according to claim 3, wherein the step of performing sound-field processing on the high-frequency right-channel signal and the high-frequency left-channel signal to generate the modified high-frequency right-channel signal and the modified high-frequency left-channel channel further comprises:

performing equalization and/or multiband dynamic range control on the high-frequency right-channel signal and the high-frequency left-channel signal.

6. The frequency response compensation method according to claim 1, wherein the step of performing sound-field processing on the low-frequency right-channel signal and the low-frequency left-channel signal to generate the modified low-frequency right-channel signal and the modified low-frequency left-channel signal comprises:

applying a fifth transfer function and a sixth transfer function respectively on the low-frequency right-channel signal to generate a main low-frequency right-channel signal and a secondary low-frequency right-channel signal;

applying a seventh transfer function and a eighth transfer function respectively on the low-frequency left-channel signal to respectively generate a main low-frequency left-channel signal and a secondary low-frequency left-channel signal;

adding the main low-frequency right-channel signal and the secondary low-frequency left-channel signal to generate the modified low-frequency right-channel signal; and adding the main low-frequency left-channel signal and the secondary low-frequency right-channel signal to generate the modified low-frequency left-channel signal.

7. The frequency response compensation method according to claim 6, wherein the step of inputting the stereo audio signal respectively into the high-pass filter and the low-pass filter, the method further comprises:

obtaining the fifth transfer function, the sixth transfer function, the seventh transfer function, and the eighth transfer function, wherein the fifth transfer function, the sixth transfer function, the seventh transfer function, and the eighth transfer function are calculated based on frequency responses at an intermediate position and a target position after low-frequency audio sound is outputted by a first test speaker and a second test speaker at an source position such that the responses at the intermediate position and the target position are concentrated with respect to those at the source position, wherein the intermediate position is located between the source position and the target position, and wherein the first test speaker and the second test speaker are substantially and respectively identical to the first speaker and the second speaker.

8. The frequency response compensation method according to claim 6, wherein the step of performing sound-field processing on the low-frequency right-channel signal and the low-frequency left-channel signal to generate the modified low-frequency right-channel signal and the modified low-frequency left-channel signal further comprises:

performing equalization and/or multiband dynamic range control on the low-frequency right-channel signal and the low-frequency left-channel signal.

9. The frequency response compensation method according to claim 1, wherein the electronic device is a mobile phone, the first speaker is a phone speaker disposed on a front side of the electronic device, and the second speaker is a multimedia speaker disposed on another side of the electronic device.

10. An electronic device, comprising:

a first speaker;

a second speaker, where in the first speaker and the second speaker are not coplanarly disposed on the electronic device;

a memory; and a controller, coupled to the first speaker, the second speaker, and the memory, wherein the controller is configured for:

inputting a stereo audio signal respectively into a high-pass filter and a low-pass filter to generate a high-frequency right-channel signal, a high-frequency left-channel signal, a low-frequency right-channel signal, and a low-frequency left-channel signal;

performing sound-field processing on the high-frequency right-channel signal and the high-frequency left-channel signal to generate a modified high-frequency right-channel signal and a modified high-frequency left-channel signal;

performing sound-field processing on the low-frequency right-channel signal and the low-frequency left-channel signal to generate a modified low-frequency right-channel signal and a modified low-frequency left-channel signal; and outputting the modified high-frequency right-channel signal and the modified low-frequency right-channel signal to the first speaker and outputting the modified high-frequency left-channel signal and the modified low-frequency left-channel signal to the second speaker, wherein the modified high-frequency right-channel signal and the modified high-frequency left-channel signal are outputted diffusely by the first speaker and the second speaker respectively, and wherein the modified low-frequency right-channel signal and the modified low-frequency left-channel signal are outputted centrally by the first speaker and the second speaker respectively.

11. The electronic device according to claim 10, wherein the controller is configured for:

inputting a right-channel input signal and a left-channel input signal of the stereo audio signal into the high-pass filter to respectively generate the high-frequency right-channel signal and the high-frequency left-channel signal; and inputting the right-channel input signal and the left-channel input signal into the low-pass filter to respectively generate the low-frequency right-channel signal and the low-frequency left-channel signal.

12. The electronic device according to claim 10, wherein the controller is configured for:

applying a first transfer function and a second transfer function respectively on the high-frequency right-channel signal to generate a main high-frequency right-channel signal and a secondary high-frequency right-channel signal;

applying a third transfer function and a fourth transfer function respectively on the high-frequency left-channel signal to respectively generate a main high-frequency left-channel signal and a secondary high-frequency left-channel signal;

adding the main high-frequency right-channel signal and the secondary high-frequency left-channel signal to generate the modified high-frequency right-channel signal; and adding the main high-frequency left-channel signal and the secondary high-frequency right-channel signal and to generate the modified high-frequency left-channel signal.

13. The electronic device according to claim 12, wherein the controller is further configured for:

obtaining the first transfer function, the second transfer function, the third transfer function, and the fourth transfer function, wherein the first transfer function, the second transfer function, the third transfer function, and the fourth transfer function are calculated based on responses at an intermediate position and a target position after high-frequency audio sound is outputted by a first test speaker and a second test speaker at an source position such that the responses at the intermediate position and the target position are diffused with respect to those at the source position, wherein the intermediate position is located between the source position and the target position, and wherein the first test speaker and the second test speaker are substantially and respectively identical to the first speaker and the second speaker; and storing the first transfer function, the second transfer function, the third transfer function, and the fourth transfer function in the memory.

14. The electronic device according to claim 12, wherein the controller is further configured for:

performing equalization and/or multiband dynamic range control on the high-frequency right-channel signal and the high-frequency left-channel signal.

15. The electronic device according to claim 10, wherein the controller is configured for:

applying a fifth transfer function and a sixth transfer function respectively on the low-frequency right-channel signal to generate a main low-frequency right-channel signal and a secondary low-frequency right-channel signal;

applying a seventh transfer function and a eighth transfer function respectively on the low-frequency left-channel signal to respectively generate a main low-frequency left-channel signal and a secondary low-frequency left-channel signal;

adding the main low-frequency right-channel signal and the secondary low-frequency left-channel signal to generate the modified low-frequency right-channel signal; and adding the main low-frequency left-channel signal and the secondary low-frequency right-channel signal to generate the modified low-frequency left-channel signal.

16. The electronic device according to claim 15, wherein the controller is further configured for:

obtaining the fifth transfer function, the sixth transfer function, the seventh transfer function, and the eighth transfer function, wherein the fifth transfer function, the sixth transfer function, the seventh transfer function, and the eighth transfer function are calculated based on frequency responses at an intermediate position and a target position after low-frequency audio sound is outputted by a first test speaker and a second test speaker at an source position such that the responses at the intermediate position and the target position are concentrated with respect to those at the source position, wherein the intermediate position is located between the source position and the target position, and wherein the first test speaker and the second test speaker are substantially and respectively identical to the first speaker and the second speaker; and storing the fifth transfer function, the sixth transfer function, the seventh transfer function, and the eighth transfer function in the memory.

17. The electronic device method according to claim 15, wherein the controller is further configured for:

performing equalization and/or multiband dynamic range control on the low-frequency right-channel signal and the low-frequency left-channel signal.

18. The electronic device according to claim 10, wherein the electronic device is a mobile phone, the first speaker is a phone speaker disposed on a front side of the electronic device, and the second speaker is a multimedia speaker disposed on another side of the electronic device.

19. A non-transitory computer readable medium, storing programs to be loaded into an electronic device having a first speaker and a second speaker not coplanarly disposed thereon to perform steps of:

inputting a stereo audio signal respectively into a high-pass filter and a low-pass filter to generate a high-frequency right-channel signal, a high-frequency left-channel signal, a low-frequency right-channel signal, and a low-frequency left-channel signal;

performing sound-field processing on the high-frequency right-channel signal and the high-frequency left-channel signal to generate a modified high-frequency right-channel signal and a modified high-frequency left-channel signal;

performing sound-field processing on the low-frequency right-channel signal and the low-frequency left-channel signal to generate a modified low-frequency right-channel signal and a modified low-frequency left-channel signal; and outputting the modified high-frequency right-channel signal and the modified low-frequency right-channel signal to the first speaker and outputting the modified high-frequency left-channel signal and the modified low-frequency left-channel signal to the second speaker, wherein the modified high-frequency right-channel signal and the modified high-frequency left-channel signal are outputted diffusely by the first speaker and the second speaker respectively, and wherein the modified low-frequency right-channel signal and the modified low-frequency left-channel signal are outputted centrally by the first speaker and the second speaker respectively.

* * * * *